(12) United States Patent
Kang et al.

(10) Patent No.: US 8,599,690 B2
(45) Date of Patent: Dec. 3, 2013

(54) METHOD AND APPARATUS FOR FAIRLY ALLOCATING RESOURCE TO NETWORK USERS

(75) Inventors: Kyoung-Soon Kang, Daejeon (KR); Hak Suh Kim, Daejeon (KR); Hyunjoo Kang, Daejeon (KR); Boo Geum Jung, Daejeon (KR); Ki Cheol Jeon, Daejeon (KR); Byungjun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 330 days.

(21) Appl. No.: 12/911,972

(22) Filed: Oct. 26, 2010

(65) Prior Publication Data

US 2011/0134754 A1    Jun. 9, 2011

(30) Foreign Application Priority Data

Dec. 9, 2009 (KR) .................. 10-2009-0122054
May 7, 2010 (KR) .................. 10-2010-0043164

(51) Int. Cl.
*H04L 12/26* (2006.01)

(52) U.S. Cl.
USPC ....................................... 370/232

(58) Field of Classification Search
USPC ............. 370/229, 432, 395.52, 232; 709/235, 709/242
See application file for complete search history.

(56) References Cited

U.S. PATENT DOCUMENTS

| | | | |
|---|---|---|---|
| 6,857,025 B1* | 2/2005 | Maruyama et al. | 709/235 |
| 7,099,273 B2* | 8/2006 | Ha et al. | 370/229 |
| 7,376,121 B2 | 5/2008 | Dunagan et al. | |
| 2005/0030965 A1* | 2/2005 | Aoki et al. | 370/432 |
| 2006/0182119 A1* | 8/2006 | Li et al. | 370/395.52 |
| 2007/0118636 A1 | 5/2007 | Yang et al. | |
| 2009/0113071 A1* | 4/2009 | Kotrla et al. | 709/242 |

* cited by examiner

*Primary Examiner* — Mark Rinehart
*Assistant Examiner* — Gbemileke Onamuti

(57) ABSTRACT

A method and an apparatus for fairly allocating resources to network users are provided. The method for fair resource allocation to network users allows the resource allocation apparatus to collect flow information between a user terminal and a service server and aggregates the flow information based on at least one of a user terminal address, a service server address, a user terminal, a service server address, and a service. The allocation resource of the user is controlled to the predetermined recommended bandwidth by using the ratio of the aggregated flow information.

13 Claims, 3 Drawing Sheets

METHOD AND APPARATUS FOR FAIRLY ALLOCATING RESOURCE TO NETWORK USERS

CROSS-REFERENCE TO RELATED APPLICATION

This application claims priority to and the benefit of Korean Patent Application Nos. 10-2009-0122054 and 10-2010-0043164 filed in the Korean Intellectual Property Office on Dec. 9, 2009 and May 7, 2010, the entire contents of which are incorporated herein by reference.

BACKGROUND OF THE INVENTION (a) Field of the Invention

The present invention relates to a method and an apparatus for fairly allocating resource to network users.

(b) Description of the Related Art

Recently, an attempt to expand a network bandwidth has been continuously conducted with the development of a transmission technology such as high-speed Internet. In addition, the Internet service users have request differentiated services to receive high-quality of assured services for each flow, depending on application services requesting service quality assurance such as Internet broadcasting, voice over IP (VoIP), virtual private network, etc., due to the development of various Internet multimedia contents. Therefore, a technology for assuring service quality in the Internet network has appeared as an important issue.

As a result, in the Internet network, methods for fair network resource allocation while assuring a bandwidth to support service applications having various requirements in addition to a best effort service type have been proposed.

Generally, a method used to fairly allocate network resources to users generates profiles for each user and provides user authentication, bandwidth allocation, quality of service (QoS) function by using the profile. However, when there are many users, the profiles should be generated as much as the number of users. Therefore, the process is complicated and extra bandwidth (for example: static bandwidth allocation) should be previously allocated to users that do not access the network, such that the network bandwidth is wasted.

In addition, since it is difficult to manage the complicated profile, maintenance cost for services is increased. Therefore, it is difficult to receive the QoS requirements in the above-mentioned environment. In particular, the profile is more complicated when IP is dynamically allocated by dynamic host configuration protocol (DHCP).

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for fair resource allocation to network users having advantages of solving the problems of difficulty in management, increase in maintenance cost, static bandwidth allocation, extensibility deficiency, and difficulty in receiving QoS requirements that may be caused by generating and using profiles for each user.

An exemplary embodiment of the present invention provides a method for fairly allocating resources allocation to network users, including:

collecting flow information between a user terminal and a service server; aggregating the flow information; and controlling a resource to be allocated to the user terminal with a predetermined recommended bandwidth by using a ratio of the aggregated flow information.

The flow information is aggregated based on at least one of source address, destination address, flow, service, and source-destination address.

Another embodiment of the present invention provides an apparatus for allocating resources, comprising a flow information collector that collects flow information passing through a network apparatus; a detector that detects an abnormally increased bandwidth by obtaining a ratio of the flow information; and a bandwidth controller that controls a resource to be allocated to a user terminal with a predetermined recommended bandwidth by using the ratio of the flow information.

DETAILED DESCRIPTION OF THE EMBODIMENTS

Figure 1:
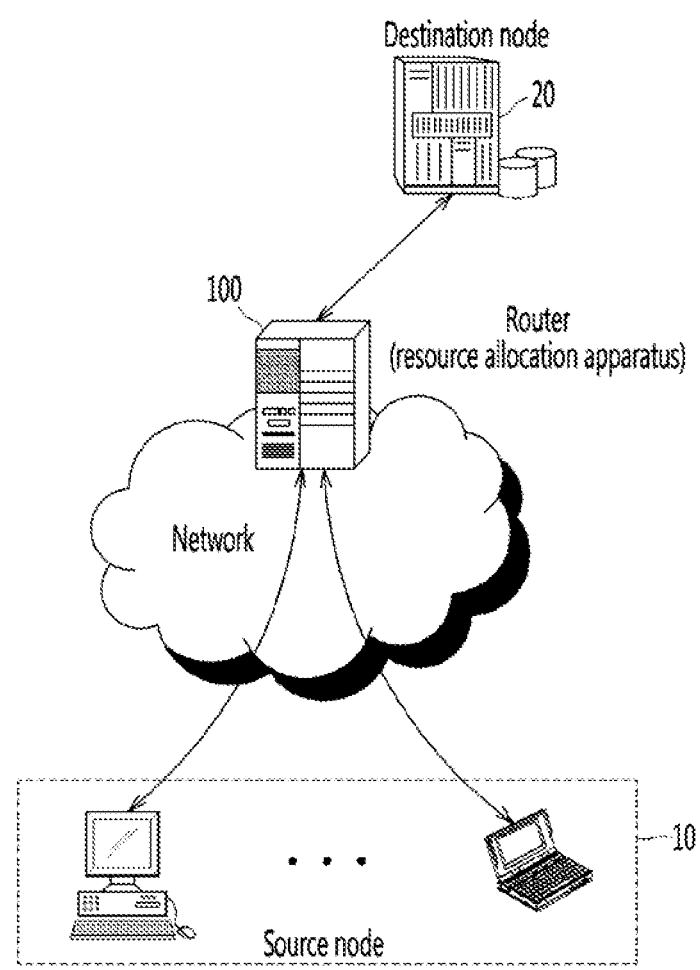
FIG. 1 shows a network configuration for fair resource allocation to network users according to an exemplary embodiment of the present invention.

In the following detailed description, only certain exemplary embodiments of the present invention have been shown and described, simply by way of illustration. As those skilled in the art would realize, the described In embodiments may be modified in various different ways, all without departing from the spirit or scope of the present invention. Accordingly, the drawings and description are to be regarded as illustrative in nature and not restrictive. Like reference numerals designate like elements throughout the specification.

In specification, unless explicitly described to the contrary, the word "comprise" and variations such as "comprises" or "comprising", will be understood to imply the inclusion of stated elements but not the exclusion of any other elements.

Hereinafter, a method and an apparatus for fair resource allocation to network users according to an exemplary embodiment of the present invention will be described with reference to the drawings.

FIG. 1 shows a network configuration for fair resource allocation to network users according to an exemplary embodiment of the present invention.

Referring to FIG. 1, a network according to an exemplary embodiment of the present invention includes a source node 10, a destination node 20, and a resource allocation apparatus 100 for fairly allocating resources.

Herein, the network may be an Internet service provider (ISP) network and a network service provider (NSP) network that provide services to users through the Internet.

The source node 10 may be user terminals that are connected to each other through a wired or wireless Internet. The destination node 20 may be a provider server that provides various services according to the connection of the source node 10.

The resource allocation apparatus 100 serves to manage the bandwidth resource between the source node 10 and the destination node 20 and fairly allocate the bandwidth to the users based on the collected flow information. Hereinafter, for convenience, the exemplary embodiment of the present invention describes the case where the resource allocation apparatus 100 is mounted on a router and the same reference numeral is used. However, the resource allocation apparatus 100 is not limited to the case where some functions of the router are applied but is configured as a separate apparatus such that it is linked with a router as well as other network apparatuses capable of performing the traffic management and can be applied to the apparatus.

Figure 2:
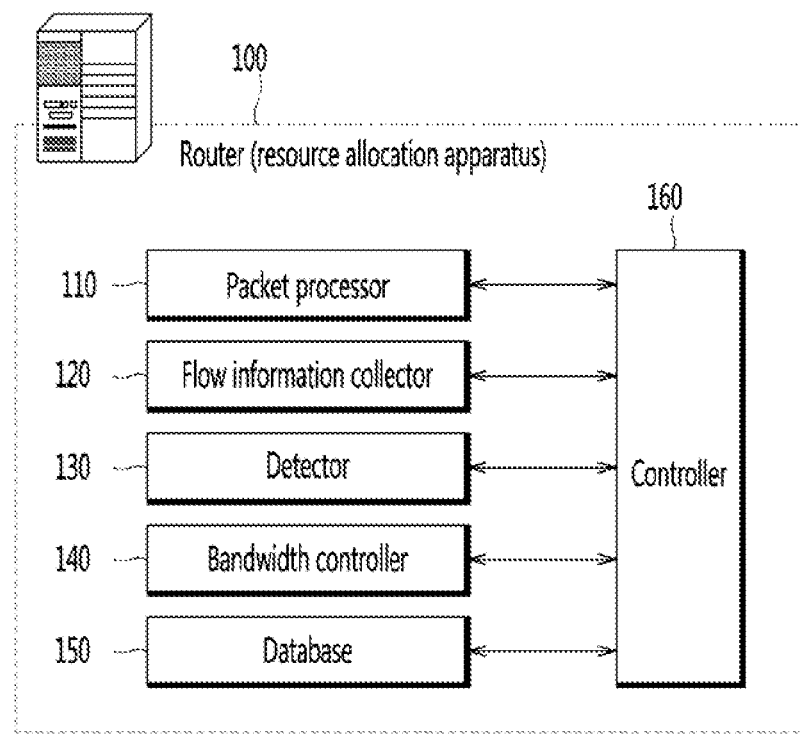
FIG. 2 is a block diagram schematically showing a configuration of a resource allocation apparatus (router) according to an exemplary embodiment of the present invention.

FIG. 2 is a block diagram schematically showing a configuration of a resource allocation apparatus (router) according to an exemplary embodiment of the present invention Referring to FIG. 2, the resource allocating apparatus according to an exemplary embodiment of the present invention includes a packet processor 110 as a flow-based router 100, a flow information collector 120, a detector 130, a bandwidth controller 140, a data base 150, and a controller 160.

The packet processor 110 looks-up packets received at an interface of a linecard of the router 100 in a routing table stored in a database 150 and serves to transmit the packets to a corresponding designation.

In addition, the packet processor 110 processes (generates) packets based on the flow divided by 6 tuples and transmit the processed packets to the flow information collector 120.

The flow means one that is configured by collecting packets having the same information based on tuples such as a source IP address, a destination IP address, a source port, a destination port, a protocol ID, and a service signature that are the header information of the IP packet.

The packet processor 110 can configure the flow by collecting only packets having all the same tuples according to the use purpose and can configure the flow by collecting the packets having some same part of 6 tuples. For example, the flow may be configured by collecting only packets having all the same source IP address, destination IP address, source port, destination port, protocol ID, and service/application signature or the flow may be configured by collecting only packets having all the same source IP address and destination IP address. Further, the flow may be configured by using other added items or only some of 6 tuples according to the use purpose.

The flow information collector 120 collects the information on the flow via the router 100. In this case, the collected flow information includes flow number, byte number, packet count number, time information according to starting and ending time, etc., that are characteristics of the corresponding flow aggregation.

The flow information collector 120 serves to aggregate the individually obtained flow information to meet conditions for providing fair. In this case, the aggregation is variously set based on the source IP address, the destination IP address, the service, etc., and is stored in the database 150.

The detector 130 uses the ratio of the aggregated byte number and the flow number and the packet count number and compares the ratio with the predetermined threshold (reference value) to detect the abnormally increased bandwidth in the corresponding flow and inform the bandwidth 140 of the abnormally increased bandwidth.

The bandwidth controller 140 determined the recommended band for each aggregation according to the predetermined threshold value. If the bandwidth for the abnormal flow is determined, the fair resource is allocated each network user by controlling the bandwidth of the aggregated flow.

The database 150 has various data and program for fairly allocating resource by the router 100 and stores data generated according to the operation.

The controller 160 serves to control the operation of each component for fairly allocating resource by the router 100.

Figure 3:
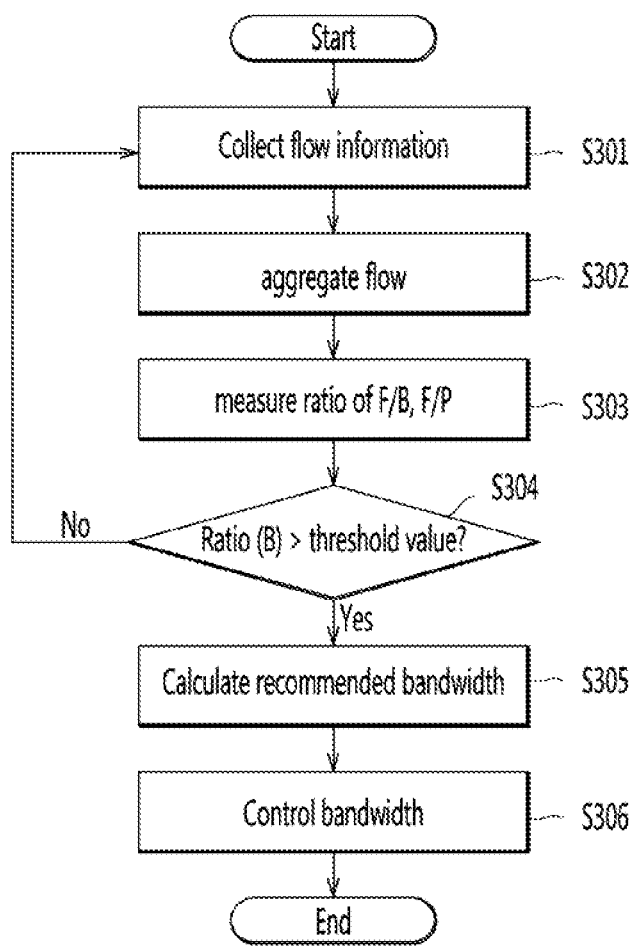
FIG. 3 is a flowchart for schematically explaining a method for fair resource allocation to network users according to an exemplary embodiment of the present invention.

FIG. 3 is a flowchart for schematically explaining a method for fair resource allocation to network users according to an exemplary embodiment of the present invention.

Referring to FIG. 3, the flow information collector 120 according to an exemplary embodiment of the present invention collects the information on the flow via the router 100 (S301). In this case, the flow information includes the source IP address, the destination IP address, the byte number, the packet number, etc. The flow information collector 120 performs the aggregation according to the desired method to meet the collected flow information to the purpose for providing the fairness (S302).

First, when fairly distributing the network use for each user according to one exemplary embodiment of the present invention, the detector 130 performs the aggregation of the flow information based on the source IP address to use the statistical information as the flow number, the byte number, and the packet number for each source IP address, thereby calculating the ratio (A) of the maximum value and the average value of each statistical information.

The ratio (B) of F/B value and F/P value is obtained to compare the ratios between the ratio (F) of the maximum flow number and the average flow number, the ratio (B) of the maximum byte number and the average byte number, and the ratio (P) of the maximum packet number and the average packet number (S303).

The detector 130 compares the ratio (B) with a predetermined threshold. If it is determined that the ratio (B) value exceeds the predetermined threshold value (S304), it is determined as the abnormally increased bandwidth and informs the bandwidth controller 140 of it.

If the bandwidth controller 140 calculates the recommended (controlled) bandwidth for the ratio exceeding the threshold value according to the predetermined policy (S305) to determine the abnormal flow, it controls the bandwidth of the aggregated flow according to the predetermined threshold value to allocate the fair resource to each network user (S306).

For example, when the threshold value is 1.5, the measured ratio (B) value is from 1.5 or more to below 3, the corresponding bandwidth is reduced to 20% and when the measured ratio (B) value is 3 or more, the corresponding bandwidth is controlled to be reduced to 50%.

Even when the average value is calculated, since the entire average may be affected when the ratio exceeds the threshold value or more, threshold, the ratio is excluded when calculating the average in the case where the calculation period is not a sufficient long.

During the process, a similar bandwidth is allocated to each user.

When fairly allocating network resource to each service server according to another exemplary embodiment of the present invention, the detector 130 performs the aggregation of the flow information based on the destination IP address to use the flow number, the byte number, the packet number as the statistical information for each destination IP address, thereby calculating the ratio (A') of the maximum value and the average value of each statistical information.

The ratio (B') between the calculated ratios is obtained as described above and when the ratio (B') exceeds the threshold value, the bandwidth allocated to the corresponding destination IP address is controlled according to the policy.

In addition, according to another exemplary embodiment of the present invention, the bandwidth between the user and the service server can be controlled by the method of using the pair of the source IP address and the destination IP address as the key value and the bandwidth for each service flow can be controlled by using the protocol, the port number, etc.

As described above, the resource allocation apparatus 100 according to the exemplary embodiment of the present invention compares the calculated ratio (B) and the threshold value based on the collected flow information to dynamically determine the bandwidth reducing ratio and dynamically control the bandwidth based thereon. As a result, the present invention sets only threshold values for each aggregation without generating the profiles for each user, thereby making it possible to simplify the network management and reduce the maintenance cost accordingly.

In particular, the present invention sets the collected flow information based on the source IP address, the destination IP address, the source and destination IP address, and the service, thereby making it possible to selectively and easily control the bandwidth for each user, each service server, and each service flow between the user and the service server.

Therefore, the present invention can provide the fair network resource to all the users and use the fair network resource even in the DHCP environment that the IP address is changed for each user.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for fairly allocating resources to network users, the method comprising:
   collecting flow information between a user terminal and a service server;
   aggregating the flow information; and
   controlling a resource to be allocated to at least one of the user terminal and the service server with a predetermined recommended bandwidth by using a ratio of the aggregated flow information,
   wherein the controlling of the resource includes:
   calculating a ratio of a maximum value and an average value of each of aggregated byte numbers, aggregated flow numbers, and aggregated packet count numbers;
   calculating a ratio (B) between said calculated ratio of the maximum value and the average value of each of the aggregated byte numbers, the aggregated flow numbers, and the aggregated packet count numbers;
   comparing the ratio (B) with a predetermined threshold value; and
   detecting an increased bandwidth according to the comparison result.

2. The method of claim 1, wherein the flow information is aggregated based on at least one of a source address, a destination address, a service, and a source-destination address.

3. The method of claim 1, wherein the flow information includes at least one of a flow number, a byte number, a packet count number, and time information according to collection starting and ending times.

4. The method of claim 1, wherein the calculating of the ratio (B) includes at least one of:
   calculating a ratio of flow information aggregated based on an address of the user terminal when fairly allocating the resource to the user terminal; and
   calculating a ratio of flow information aggregated based on an address of the service server when fairly allocating the resource to the service server.

5. The method of claim 1, wherein the controlling of the resource further comprises determining the predetermined recommended bandwidth according to a predetermined policy based on a range representing how much the ratio (B) exceeds the predetermined threshold value.

6. The method of claim 1, wherein the ratio (B) includes a ratio of a F/B value and a F/P value, and
   wherein, in the F/B value and the F/P value, F represents a ratio of a maximum flow number and an average flow number, B represents a ratio of a maximum byte number and an average byte number, and P represents a ratio of a maximum packet count number and an average packet count number.

7. An apparatus for allocating resources, the apparatus comprising:
   a flow information collector configured to collect and aggregate flow information, passing through a network, between a user terminal and a service server;
   a detector configured to detect an increased bandwidth by obtaining a ratio of the aggregated flow information; and
   a bandwidth controller configured to control a resource to be allocated to at least one of the user terminal and the service server with a predetermined recommended bandwidth by using the ratio of the aggregated flow information,
   wherein the detector is configured to:
   calculate a ratio of a maximum value and an average value of each of aggregated byte numbers, aggregated flow numbers, and aggregated packet count numbers;
   calculating a ratio (B) between said calculated ratio of the maximum value and the average value of each of the aggregated byte numbers, the aggregated flow numbers, and the aggregated packet count numbers;
   compare the ratio (B) with a predetermined threshold value; and
   detect the increased bandwidth according to the comparison result.

8. The apparatus of claim 7, wherein the flow information collector is configured to aggregate the flow information based on at least one of a source address, a destination address, a service, and a source-destination address.

9. The apparatus of claim 7, wherein the bandwidth controller is configured to control a bandwidth between the user terminal and the service server by using a pair of an address of the user terminal and an address of the service server as a key value or control a bandwidth for each service flow by using a protocol and a port number.

10. The apparatus of claim 7, wherein the flow information includes at least one of a flow number, a byte number, a packet count number, and time information according to collection starting and ending times.

11. The apparatus of claim 7, wherein the ratio (B) is calculated by at least one of:

calculating a ratio of flow information aggregated based on an address of the user terminal when fairly allocating the resource to the user terminal; and calculating a ratio of flow information aggregated based on an address of the service server when fairly allocating the resource to the service server.

12. The apparatus of claim 7, wherein the bandwidth controller is configured to determine the predetermined recommended bandwidth according to a predetermined policy based on a range representing how much the ratio (B) exceeds the predetermined threshold value.

13. The apparatus of claim 7, wherein the ratio (B) includes a ratio of a F/B value and a F/P value, and wherein, in the F/B value and the F/P value, F represents a ratio of a maximum flow number and an average flow number, B represents a ratio of a maximum byte number and an average byte number, and P represents a ratio of a maximum packet count number and an average packet count number.

* * * * *